United States Patent [19]
Ziemek

[11] Patent Number: 5,658,473
[45] Date of Patent: Aug. 19, 1997

[54] METHOD FOR PRODUCING LENGTHWISE WELDED METAL TUBES

[75] Inventor: Gerhard Ziemek, Langenhagen, Germany

[73] Assignee: Alcatel Kabel AG & Co, Germany

[21] Appl. No.: 583,652

[22] Filed: Jan. 11, 1996

[30] Foreign Application Priority Data

Jan. 24, 1995 [DE] Germany .................. 195 01 945.8

[51] Int. Cl.⁶ .................................................. B23K 26/00
[52] U.S. Cl. ........................... 219/121.64; 219/121.76
[58] Field of Search ..................... 219/121.63, 121.64, 219/121.76, 121.77

[56] References Cited

U.S. PATENT DOCUMENTS

| 3,615,977 | 10/1971 | Lehnert et al. | |
|---|---|---|---|
| 4,759,487 | 7/1988 | Karlinski | 219/121.63 |
| 4,769,522 | 9/1988 | Lentz et al. | 219/121.63 |
| 4,857,697 | 8/1989 | Melville | 219/121.63 |
| 5,216,220 | 6/1993 | Davis et al. | 219/121.63 |

FOREIGN PATENT DOCUMENTS

| 2059876 | 7/1992 | Canada | 219/121.64 |
|---|---|---|---|
| 4117263 | 7/1992 | Germany . | |
| 60-46890 | 3/1985 | Japan | 219/121.64 |
| 60-121093 | 6/1985 | Japan | 219/121.64 |
| 62-296981 | 12/1987 | Japan | 219/121.64 |
| 1-258891 | 10/1989 | Japan | 219/121.64 |
| 3-32481 | 2/1991 | Japan | 219/121.63 |

*Primary Examiner*—Teresa J. Walberg
*Assistant Examiner*—Gregory L. Mills
*Attorney, Agent, or Firm*—Ware, Fressola, Van Der Sluys & Adolphson LLP

[57] ABSTRACT

In a method for producing lengthwise welded metal tubes, a metal tape is drawn from a supply reel and is gradually formed into a slotted tube, and the slotted tube is welded by a laser beam, the tape edges are heated by a separate laser beam. The laser beams for the heating and welding strike the lengthwise seam at an angle that is less than 15° from the vertical, the distance between the burn spots produced by the laser beams is between 1 and 5 mm, and the power applied to the tape edges by the first laser beam is sufficient to raise the temperature of the tape edges to at least one half of the $T_F-T_R$ difference, where $T_F$ is the fusing temperature of the metal and $T_R$ is the room temperature.

5 Claims, 2 Drawing Sheets

5,658,473

METHOD FOR PRODUCING LENGTHWISE WELDED METAL TUBES

BACKGROUND OF THE INVENTION

1. Technical Field

The invention concerns a method for producing lengthwise welded metal tubes in which a metal tape is drawn from a supply reel and is gradually formed into a slotted tube. The slotted tube is welded by a laser beam while the edges of the tape are preheated by a separate laser beam.

2. Description of the Prior Art

A method for producing lengthwise welded tubes is known from DE 4 117 263 A1. The known method is used to circumvent expensive tape degreasing by means of chlorinated hydrocarbons, which cause ecological concerns. To that end, the tape edge areas are heated before welding to such a temperature that grease, which adheres to the tape surface, evaporates. The grease coating on the tape surface occurs when the manufacturer rolls the sheet metal, and it remains on the surface to protect the metal against corrosion. The grease is often a hindrance during welding.

According to a first variation, the grease is evaporated by a laser beam, which also welds the tape edges. According to a second variation, the grease is evaporated by a laser beam and the welding is accomplished with an electric arc. The laser beam heats the tape edges to about 500° C. so that all the grease evaporates, and the tape edges at the welding point become preheated with respect to the ambient temperature. For constructive reasons, the distance between the focal spot of the laser beam and the weld area created by the electric arc is rather large, so that heat produced by the laser beam in the tape edges can diffuse more or less quickly, depending on the heat conductivity of the metal tape and the production speed. For example, when copper or aluminum tapes are welded, the tape edges in the welding spot area are barely preheated, while noticeable heating of the tape edges can be found with alloyed steels, e.g. stainless steel, because of the low heat conductivity.

SUMMARY OF THE INVENTION

An object of the invention is to improve the prior art method so that considerable heating of the tape edges can be achieved to thereby increase the production speed. The present method for producing lengthwise welded metal tubes, comprises the steps of: drawing a metal tape having tape edges from a supply reel; gradually forming the metal tape into a slotted tube; heating the tape edges with a heating laser beam which produces a heating focal spot, the heating laser beam striking the tape edges at an angle that is less than 15° from vertical with sufficient power to raise the temperature of the tape edges to at least one half of the $T_F$–$T_R$ difference, where $T_F$ is the fusing temperature of the metal and $T_R$ is the room temperature; and welding the tape edges with a welding laser beam which produces a welding focal spot, the welding laser beam striking the tape edges at an angle that is less than 15° from vertical, the heating focal spot and the welding focal spot produced by the laser beams being spaced apart a distance between 1 and 5 mm. The laser beams can be provided by two solid-state lasers with identical outputs on the order of 1–3 KW. The diameter of the heating focal spot is ideally larger than the diameter of the welding focal spot.

Desirably, the method includes the additional step of providing at least one cooled shielding plate to absorb energy reflected from the tape edges.

The invention will be fully understood when reference is made to the following detailed description taken in conjunction with the accompanying drawing.

DETAILED DESCRIPTION OF THE INVENTION

Figure 1:
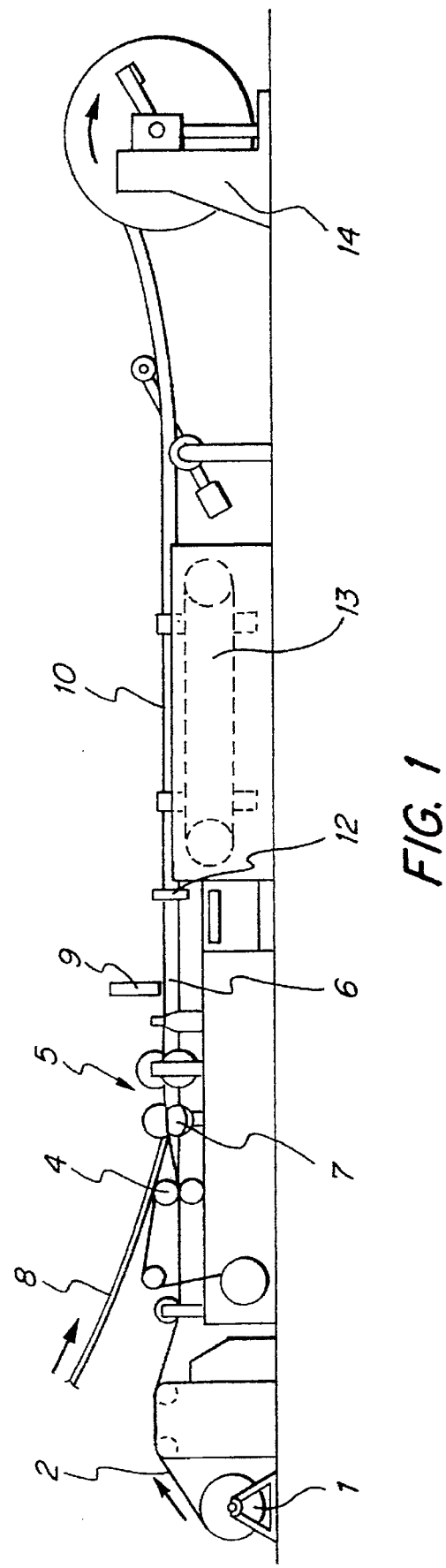
FIG. 1 is a side view of an apparatus used to carry out the method of the invention.

A steel tape 2 is drawn from a tape supply 1 and routed to a trimming device 4, in which the tape edges are cut. The untreated steel tape 2 carries a film of grease provided at the plant by the manufacturer and reaches a shaping device 5 in which the steel tape 2 passes through several stages in order to be shaped into a slotted tube 6. The first shaping stage 7 is a rolling tool, while the following shaping stages are cone-shaped tubes and rings located behind them. A cable core 8, e.g. an optical waveguide, can be placed into the still open slotted tube before the first shaping stage 7, in which the curvature of the finished tube is usually formed in the tape edge area. However, cable core 8 can also be a metal tube, which is positioned to be concentric with the slotted tube 6, in a not illustrated manner. The annular gap between the metal tube and the lengthwise welded tube can be filled with a polyurethane-based self-foaming plastic foam. Such a process is actually known from U.S. Pat. No. 3,615,917.

After it leaves the shaping device 5, the slotted tube 6 passes under a welding device 9 to form a welded tube 10. The diameter of the welded tube 10 can be reduced by means of a drawing die 12. A pulling device for transporting the welded tube 10 is a so-called split clamp caterpillar capstan 13 comprising a number of split clamp pairs which grip and release the tube 10, and are attached to an endless chain drive. The finished product can be wound onto a storage spool 14.

If heat-insulated conduction tubes according to DE-PS 1 779 406 are to be manufactured, the drawing die 12 is omitted and a not illustrated continuous corrugation device is located behind the split clamp caterpillar capstan 13.

The welding device 9 is a laser welding device. It is illustrated enlarged in FIG. 2.

The welding device 9 comprises two laser welding heads 9a and 9b arranged successively in the lengthwise direction of the slotted tube 6, each of which is connected to a separate not illustrated laser source through an optical waveguide 10a and 10b. Each laser welding head 9a and 9b respectively contains optics 11a and 11b, which concentrate the laser beam so that the focal point is located closely above or closely below the welded seam.

The tubes under consideration have the following dimensions:
External diameter 3 mm
Wall thickness 0.2 mm.

Such tubes, which are made of stainless steel, are used as protective sheaths for optical waveguides. If such tubes are produced with a conventional laser welding device, production speeds of 6.5 m/min can be attained. To increase the speed, the intensity of the laser beam must be increased. The result is that the metal evaporates and the reflected energy can only be restrained with difficulty.

This is where the invention is put to good use. The laser welding head 9a produces a heating focal spot in the tape edge area of the slotted stainless steel tube 6, which heats the tape edges to a temperature of about 600° C. The welding focal spot of the laser welding head 9b fuses the preheated material in the welding seam area and produces a welded seam.

Figure 2:
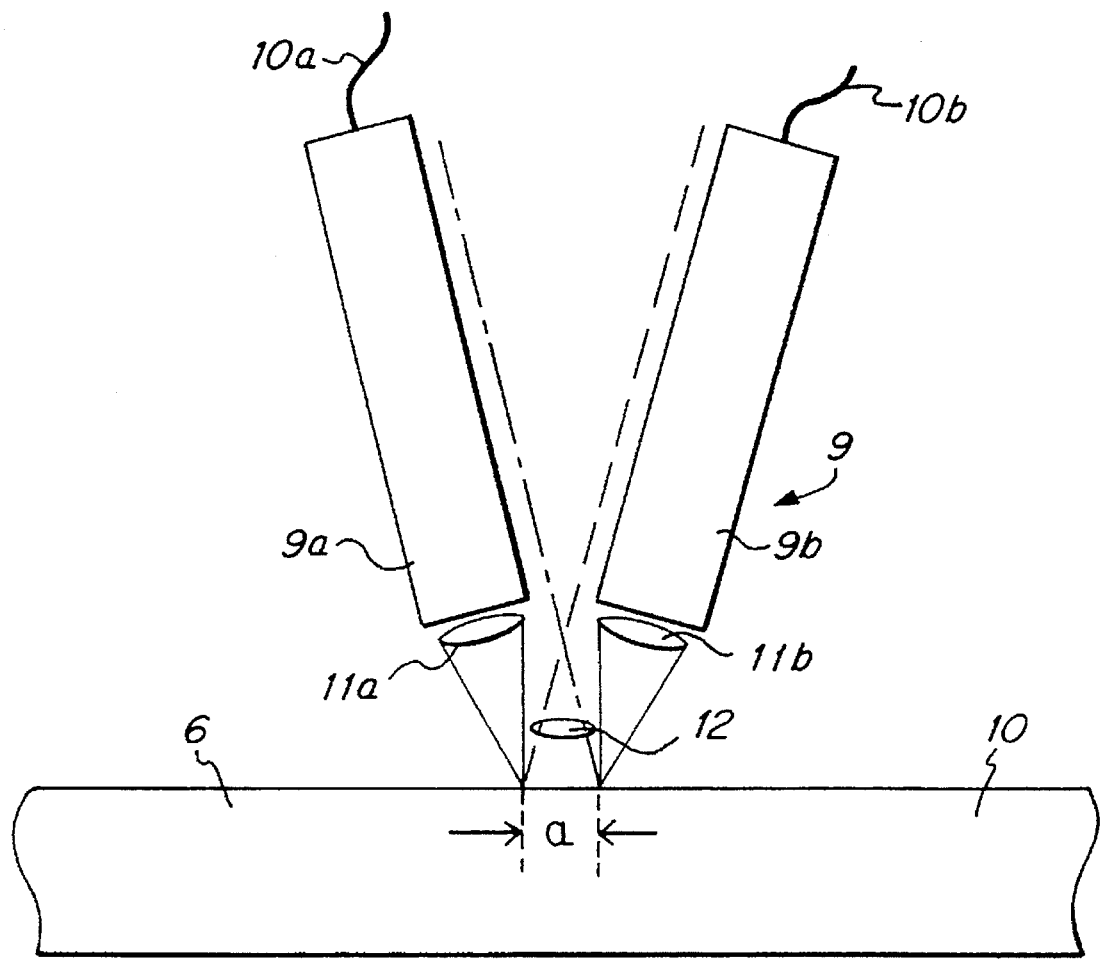
FIG. 2 is a side view of a welding device used in the method of the invention.

FIG. 2 illustrates an inclination of the laser welding heads 9a and 9b in the direction of the welded seam. The laser welding heads 9a and 9b are vertically inclined with respect to each other so that their focal spots are located as closely as possible to each other. The angle of inclination of the laser welding heads 9a and 9b is less than 20°. The diameter of the heating focal spot of the first welding head 9a is larger than the diameter of the welding focal spot of the second welding head 9b.

Ideally, the laser beams for the heating and welding strike the lengthwise seam at less than a 15° angle from the vertical, the distance a between the focal spots produced by the laser beams is between 1 and 5 mm, and the power applied by the first laser beam to the tape edges should be sufficient to raise their temperature by at least one half of the $T_F - T_R$ difference, where $T_F$ is the fusing temperature of the metal and $T_R$ is the room temperature.

The laser welding heads can be solid-state lasers with the same output on the order of 1–3 KW. With laser welding heads of about 1.5 KW, the distance a should be about 2 mm and the angle of inclination less than 15°. This prevents the radiated energy from one laser welding head to radiate into the other laser welding head.

The energy radiated from the surface of tube 6 or 10 can be absorbed by means of so-called cooled shielding plates 12, which are positioned between the laser beams.

However, the invention is also applicable if the laser welding heads are inclined crosswise to the welded seam. A combination of both directions of inclination can also be envisioned.

The preferred embodiment described above admirably achieves the objects of the invention. However, it will be appreciated that departures can be made by those skilled in the art without departing from the spirit and scope of the invention which is limited only by the following claims.

What is claimed is:

1. A method for producing lengthwise welded metal tubes, comprising the steps of:

(a) drawing a metal tape having tape edges from a supply reel;

(b) gradually forming the metal tape into a slotted tube;

(c) heating the tape edges with a heating laser beam from a first laser energy source having a heating laser head adjacent the tape edges and which produces a heating focal spot, the heating laser beam striking the tape edges at an angle that is less than 15° from vertical with sufficient power to raise the temperature of the tape edges to at least one half of the $T_F - T_R$ difference, where $T_F$ is the fusing temperature of the metal and $T_R$ is the room temperature; and (d) welding the tape edges with a welding laser beam from a second laser energy source having a welding laser head adjacent the tape edges and which produces a welding focal spot, the Welding laser beam striking the tape edges at an angle that is less than 15° from vertical, the welding laser head and the heating laser head being inclined relative to each other so that the heating focal spot and the welding focal spot produced by the laser beams are spaced apart a distance between 1 and 5 mm.

2. A method as claimed in claim 1, further comprising the step of providing at least one cooled shielding plate to absorb energy reflected from the tape edges.

3. A method as claimed in claim 1, wherein the laser beams are provided by two solid-state lasers with identical outputs in a range of between 1 kW and 3 kW.

4. A method as claimed in claim 3, wherein the diameter of the heating focal spot is larger than the diameter of the welding focal spot.

5. A method as claimed in claim 1, wherein the diameter of the heating focal spot is larger than the diameter of the welding focal spot.

* * * * *